US 8,520,379 B2

(12) United States Patent
Hirai et al.

(10) Patent No.: US 8,520,379 B2
(45) Date of Patent: Aug. 27, 2013

(54) ELECTRONIC APPARATUS

(75) Inventors: Yuichi Hirai, Hamura (JP); Ryosuke Saito, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/239,184

(22) Filed: Sep. 21, 2011

(65) Prior Publication Data

US 2012/0162892 A1 Jun. 28, 2012

(30) Foreign Application Priority Data

Dec. 24, 2010 (JP) ................................ 2010-288825

(51) Int. Cl.
*H05K 5/00* (2006.01)
*H05K 7/00* (2006.01)
*H05K 7/14* (2006.01)
*H04M 1/00* (2006.01)

(52) U.S. Cl.
USPC ............. 361/679.27; 361/679.28; 361/679.3; 361/679.57; 361/679.58; 455/575.1; 455/575.3; 174/535

(58) Field of Classification Search
USPC ............. 361/679.01, 679.02, 679.08, 679.09, 361/679.3, 679.55–679.59, 679.26–679.29; 455/325, 556.1, 550.1, 90.1, 575.1
See application file for complete search history.

(56) References Cited

U.S. PATENT DOCUMENTS

| | | | |
|---|---|---|---|
| 6,774,959 B2 | 8/2004 | Agata et al. | |
| 7,397,655 B2 | 7/2008 | Nakatani et al. | |
| 7,426,114 B2 | 9/2008 | Nakatani et al. | |
| 7,710,728 B2 | 5/2010 | Arisaka et al. | |
| 7,957,125 B2 | 6/2011 | Iwata | |
| 2003/0016489 A1 | 1/2003 | Agata et al. | |
| 2005/0115025 A1 | 6/2005 | Minaguchi et al. | |
| 2007/0047191 A1* | 3/2007 | Goto et al. .................... | 361/683 |
| 2007/0053144 A1 | 3/2007 | Nakatani et al. | |
| 2007/0146978 A1 | 6/2007 | Nakatani et al. | |
| 2007/0165386 A1* | 7/2007 | Nakatani et al. .............. | 361/752 |
| 2008/0259537 A1 | 10/2008 | Arisaka et al. | |
| 2009/0323269 A1 | 12/2009 | Iwata | |

FOREIGN PATENT DOCUMENTS

| | | |
|---|---|---|
| JP | 2000-207060 A | 7/2000 |
| JP | 2002-132174 | 5/2002 |

(Continued)

OTHER PUBLICATIONS

First Office Action mailed on Jan. 24, 2012 by Japan Patent Office in the corresponding Japanese Patent Application No. 2010-288825.

*Primary Examiner* — Zachary M Pape
*Assistant Examiner* — Jerry Wu
(74) *Attorney, Agent, or Firm* — Knobbe, Martens, Olson & Bear LLP

(57) ABSTRACT

According to one embodiment, an electronic apparatus includes a first case, a second case, a first hinge which has a first fixing portion fixed to the first case and a second fixing portion fixed to the second case and rotatably connects the first case and the second case, and a first reinforcing plate configured to be fixed to the first fixing portion and spaced apart from an inner surface of a first cover and an inner surface of a second cover inside the first case. The first case includes a first storing portion storing electronic parts and a second storing portion projecting from the first storing portion and storing the first fixing portion. The first reinforcing plate extends over both the first storing portion and the second storing portion.

7 Claims, 11 Drawing Sheets

(56) References Cited

FOREIGN PATENT DOCUMENTS

| JP | 2003-029241 | | 1/2003 |
| JP | 2005-165478 | A | 6/2005 |
| JP | 2007-065874 | | 3/2007 |
| JP | 2007-179152 | A | 7/2007 |
| JP | 2007-188311 | A | 7/2007 |
| JP | 2008-090437 | A | 4/2008 |
| JP | 2009-294862 | A | 12/2009 |
| JP | 2010-009387 | A | 1/2010 |
| JP | 2010-146199 | A | 7/2010 |

\* cited by examiner

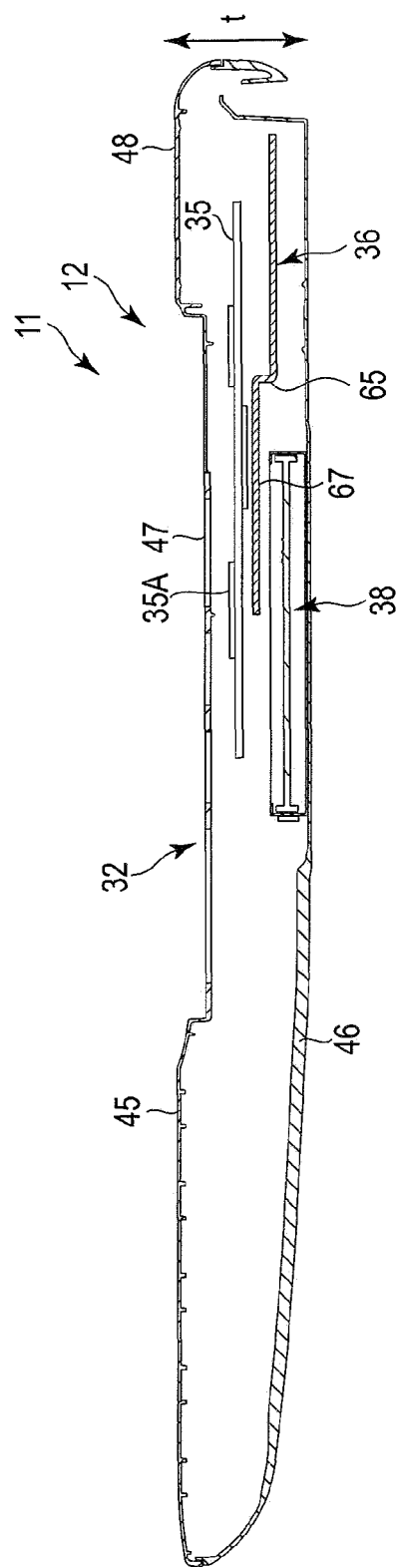
F I G. 3

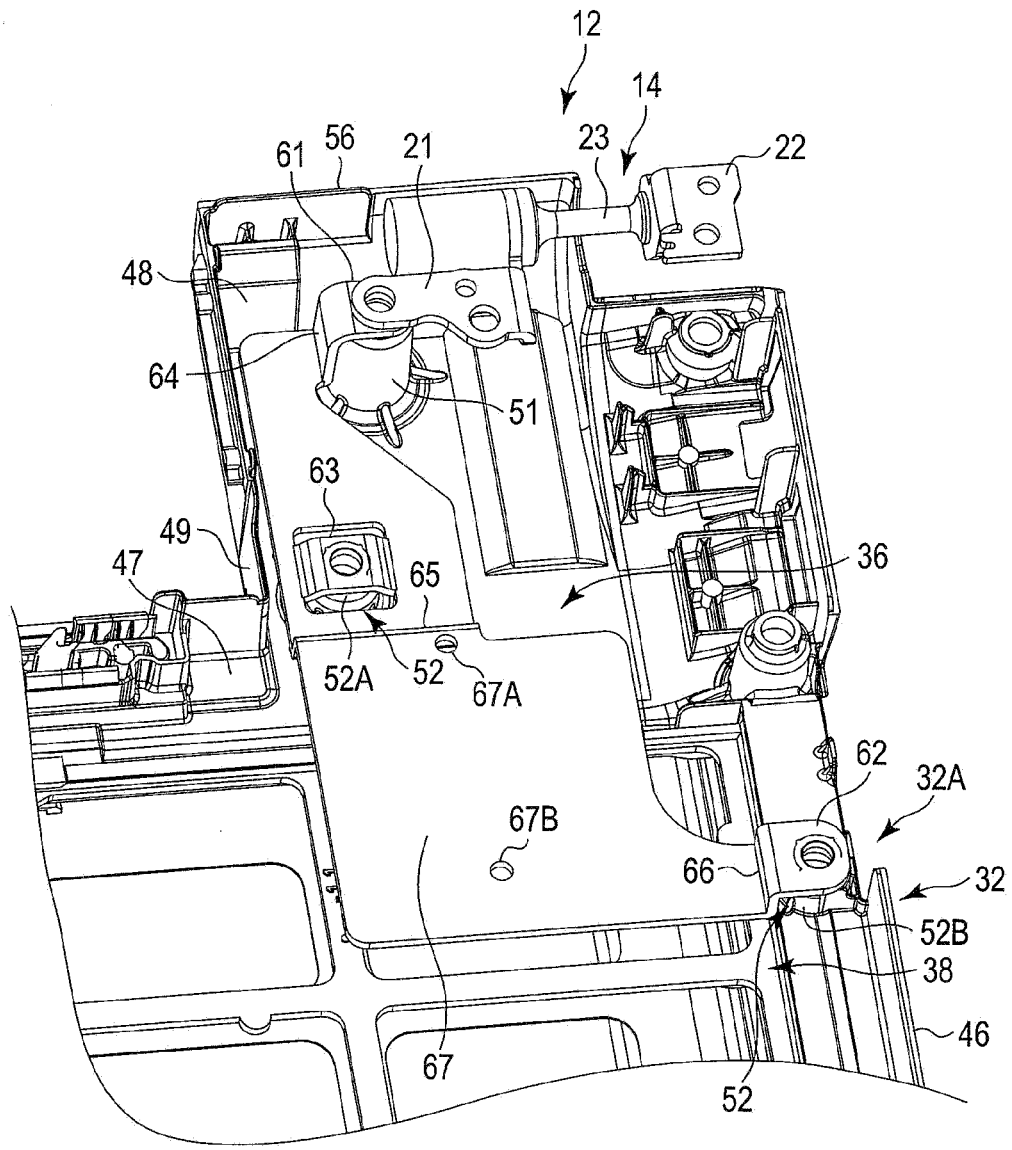
F I G. 5

ELECTRONIC APPARATUS

CROSS-REFERENCE TO RELATED APPLICATIONS

This application is based upon and claims the benefit of priority from Japanese Patent Application No. 2010-288825, filed Dec. 24, 2010; the entire contents of which are incorporated herein by reference.

FIELD

Embodiments described herein relate generally to an embodiment of the present invention relates to an electronic apparatus having a display unit.

BACKGROUND

A type of electronic apparatus comprises a display unit having a liquid crystal panel which is rotatable with respect to a main body unit having a keyboard.

Since the display unit of electronic apparatus of this type is liable to wobble, there has been a need for improvement to avoid wobbling.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary cross-sectional view taken along a line F3-F3 in FIG. 2.

FIG. 5 is an exemplary enlarged perspective view showing the interior of the first case (main body unit) shown in FIG. 4.

DETAILED DESCRIPTION

Various embodiments will be described hereinafter with reference to the accompanying drawings.

In general, according to one embodiment, an electronic apparatus includes a first case, a second case, a first hinge which has a first fixing portion fixed to the first case and a second fixing portion fixed to the second case and rotatably connects the first case and the second case, and a first reinforcing plate configured to be fixed to the first fixing portion and spaced apart from an inner surface of a first cover and an inner surface of a second cover inside the first case. The first case includes a first storing portion storing electronic parts and a second storing portion projecting from the first storing portion and storing the first fixing portion. The first reinforcing plate extends over both the first storing portion and the second storing portion.

An embodiment of a portable computer as an example of an electronic apparatus will be described below with reference to FIG. 1 to FIG. 11.

Figure 1:
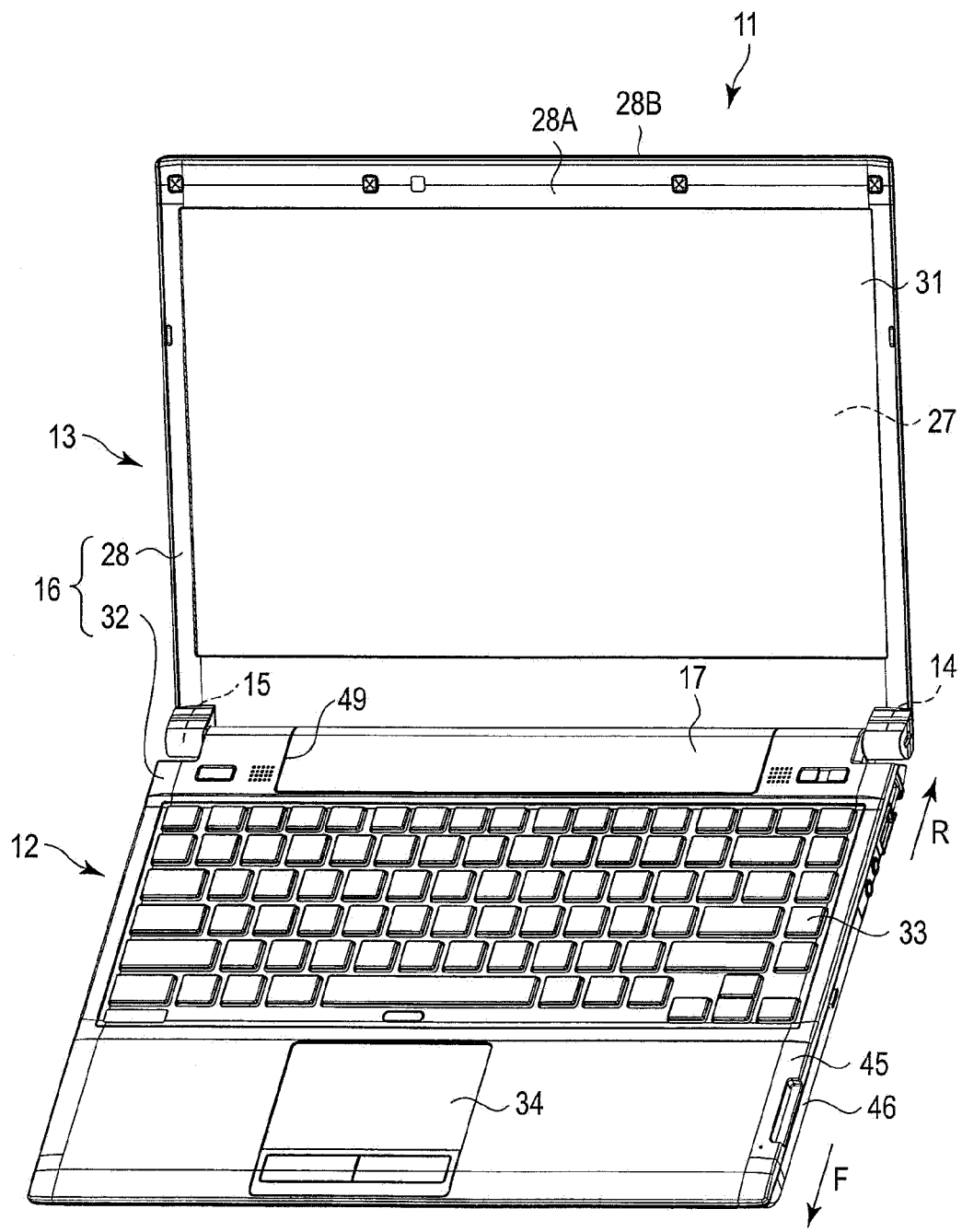
FIG. 1 is an exemplary perspective view showing a portable computer as an example of an electronic apparatus according to a first embodiment.

As shown in FIG. 1, a portable computer 11 comprises a main body unit 12, a display unit 13 configured to lie over the main body unit 12 and stand from the main body unit 12, and a first hinge (connecting portion) 14 and a second hinge (connecting portion) 15 provided between the main body unit 12 and the display unit 13. The first hinge 14 and the second hinge 15 rotatably connect a first case 32 and a second case 28.

Figure 2:
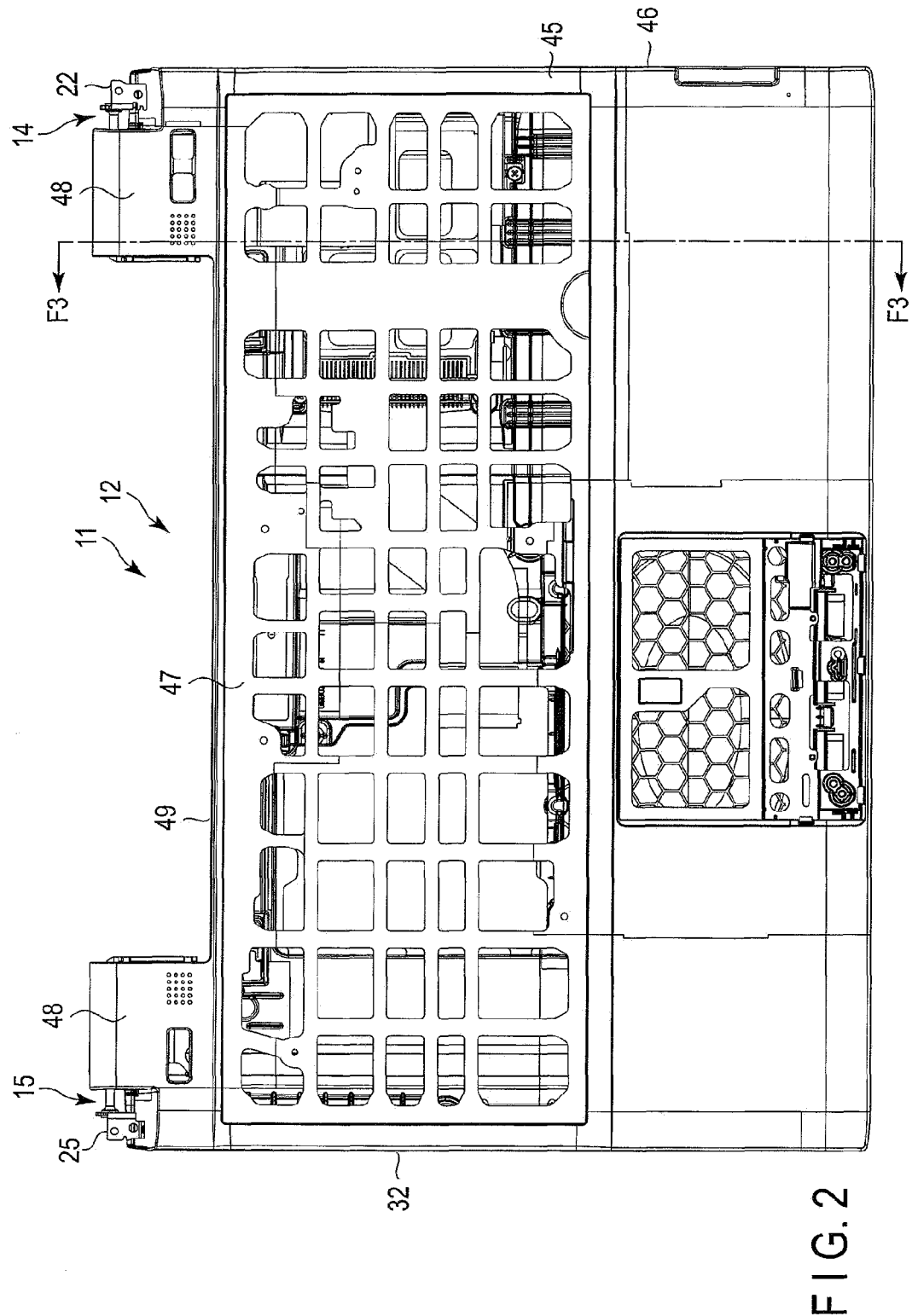
FIG. 2 is an exemplary top view showing a first case of the portable computer shown in FIG. 1.
Figure 4:
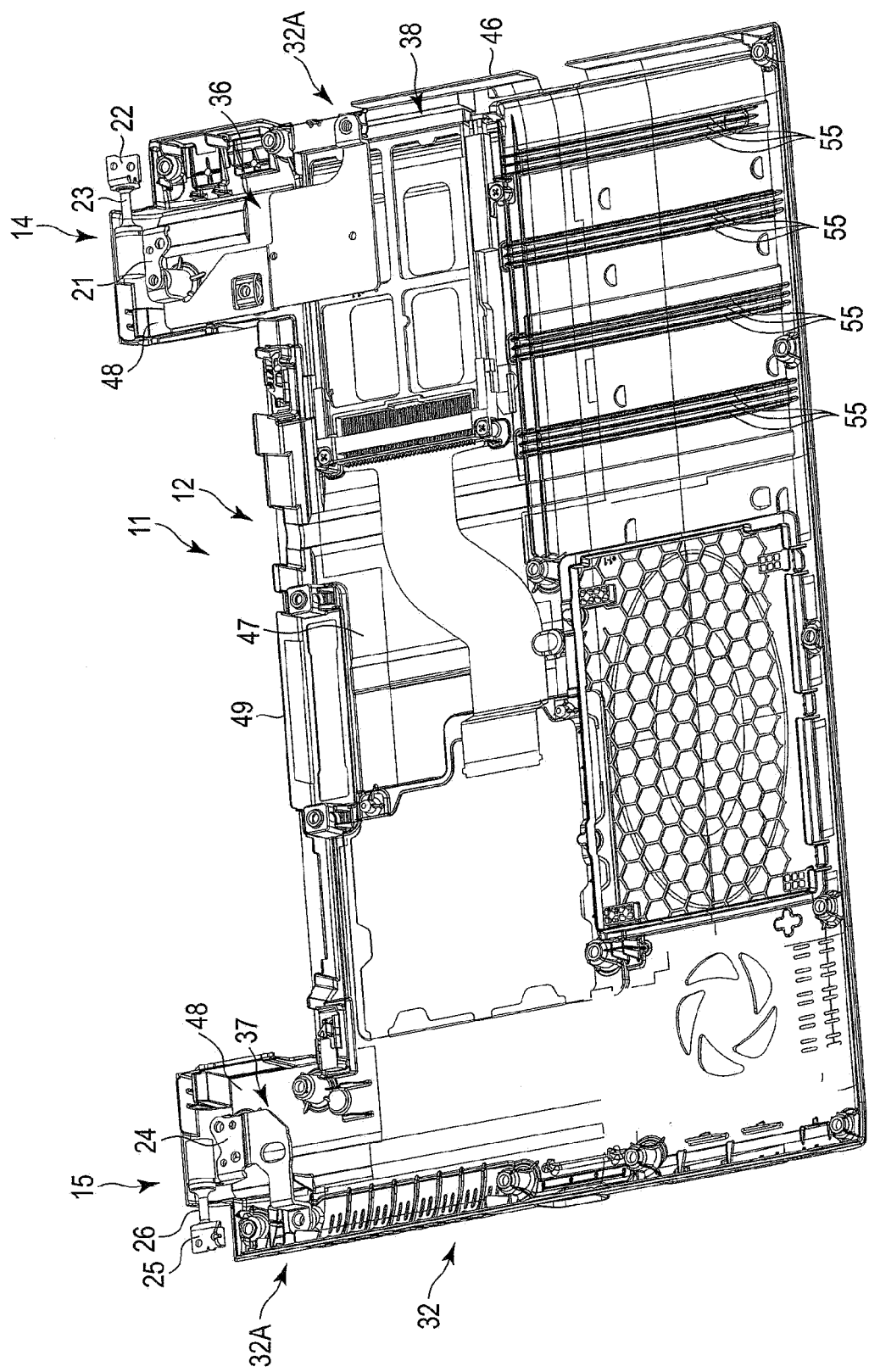
FIG. 4 is an exemplary perspective view showing an interior of the first case (main body unit) of the portable computer shown in FIG. 1.

As shown in FIG. 2 and FIG. 4, the first hinge 14 comprises a first fixing portion 21 fixed to the first case 32 (to be described later) of the main body unit 12, a second fixing portion 22 fixed to the second case 28 (to be described later) of the display unit 13, and a first shaft 23 provided between the first fixing portion 21 and the second fixing portion 22. The first fixing portion 21, the second fixing portion 22 and the first shaft 23 are all made of carbon steel. The first fixing portion 21 is provided with a through hole to pass a first fixing member 41 (to be described later) therethrough.

The second hinge 15 comprises a third fixing portion 24 fixed to the first case 32 of the main body unit 12, a fourth fixing portion 25 fixed to the second case 28 of the display unit 13, and a second shaft 26 provided between the third fixing portion 24 and the fourth fixing portion 25. The third fixing portion 24, the fourth fixing portion 25 and the second shaft 26 are all made of carbon steel.

As shown in FIG. 1, the display unit 13 comprises a display panel (display device) 27, the second case (second casing) 28 surrounding the periphery of the display panel 27 and a touch panel (tablet) 31 provided on the main surface of the display panel 27. The display panel 27 is constituted by, for example, a liquid crystal display panel. The display unit 13 of this embodiment is heavier by the weight of the touch panel 31 than a portable computer which does not have the touch panel 31. Therefore, the portable computer 11 of this embodiment is more likely to produce vibrations of the display unit 13, for example, when the display unit 13 is opened or closed, as compared to a portable computer which does not have the touch panel 31.

The second case (second casing) 28 includes a mask 28A which is frame-shaped and covers a front face of the display panel 27, and a cover 28B which covers a back face of the display panel. The second case 28 is separate from the first case 32.

As shown in FIG. 1 to FIG. 4, FIG. 7 and FIG. 8, the main body unit 12 comprises, for example, the first case (first casing) 32 forming a shell, a keyboard 33 and a touch pad 34 attached to the first case 32, a printed circuit board (mother board) 35 contained inside the first case 32, a first reinforcing plate 36 configured to be integrally fixed to the first fixing portion 21 of the first hinge 14, a second reinforcing plate 37 integral with the third fixing portion 24 of the second hinge 15, a memory card slot 38 provided within the first case 32 and first to fourth fixing members 41 to 44. The printed circuit board 35 is provided with an electronic part 35A, such as a CPU, to comprehensively control the portable computer 11 in its entirety The memory card slot 38 in this embodiment is constituted by, for example, a PC card slot which is a slot for a PC card, but should not be limited thereto. The memory card slot 38 may be a slot for another type of memory, such as a flash memory. The memory card slot 38 is formed of only a frame for weight reduction. Furthermore, a top panel is omitted from the memory card slot 38. An insulating sheet (not shown) made of synthetic resin is provided at a position where a top panel might be located.

The first case 32 and the second case 28 constitute a casing 16 of the portable computer 11. Both the first case 32 and the second case 28 are made of, for example, a magnesium alloy, but may be made of, for example, a synthetic resin. The first to fourth fixing members 41 to 44 are constituted by screws. This embodiment has two second fixing members 42.

As shown in FIG. 1, the first case (first casing) comprises a first portion (first cover) 45 constituting an upper half in a thickness direction t of the main body unit 12 and a second portion (second cover) 46 constituting a lower half in the thickness direction t of the main body unit 12. The first case 32 is constituted by butting the first portion 45 and the second portion 46 to face each other in the thickness direction t.

As shown in FIGS. 1 and 2, the first case 32 further comprises a first storing portion 47 to which the keyboard 33 etc. are attached, a pair of second storing portions 48 projecting from the first storing portion 47 and a cut portion 49 provided between the two second storing portions 48. A battery pack 17 is removably attached to the cut portion 49. As shown in FIG. 4, one of the first storing portions 48 stores the first fixing portion 21 of the first hinge 14, and the other of the first storing portions 48 stores the third fixing portion 24 of the second hinge 15. Thus, since the portable computer 11 of this embodiment has the cut portion 49, the strength of the second storing portions 48 may relatively low and measures for vibration isolation of the second case 28 may be important.

Figure 6:
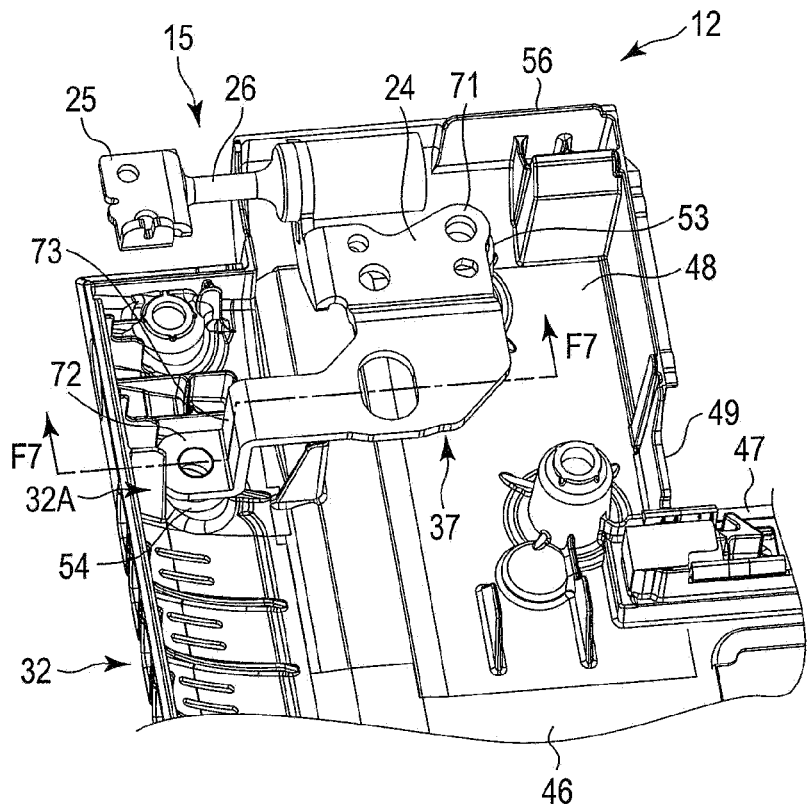
FIG. 6 is an exemplary enlarged perspective view showing the interior of the first case (main body unit) shown in FIG. 4.

As shown in FIGS. 4 to 6, the first case 32 comprises pairs of first to fourth boss 51 to 54, one of each pair projecting from the inner surface of the first portion (first cover) 45 and the other projecting from the inner surface of the second portion (second cover) 46. A plurality of sets of three reinforcing ribs 55 are provided on the inner surface of the second portion 46 of the first case 32. The reinforcing ribs 55 extend in, for example, the front-back direction of the portable computer 11. The reinforcing ribs 55 improve the strength of the second portion 46.

As shown in FIG. 5, the pair of first bosses 51 are disposed inside the second storing portion 48 of the first case 32 near a most distal end portion 56 of the second storing portion 48. This embodiment includes a plurality of pairs of second bosses 52, for example, two pairs of second bosses 52. One pair 52A of second bosses 52 are provided in a base portion of the second storing portion 48. The other pair 52B of the second bosses 52 are provided in the first storing portion 47 of the first case 32 and near an edge portion 32A of the first case 32.

As shown in FIG. 6, the pair of third bosses 53 are provided inside the second storing portion 48 of the first case 32 near the most distal end portion 56 of the second storing portion 48. The pair of fourth bosses 54 are provided near the pair of third bosses 53. The pair of fourth bosses 54 are provided in the second storing portion 48 of the first case 32 and near the edge portion 32A of the first case 32.

Figure 9:
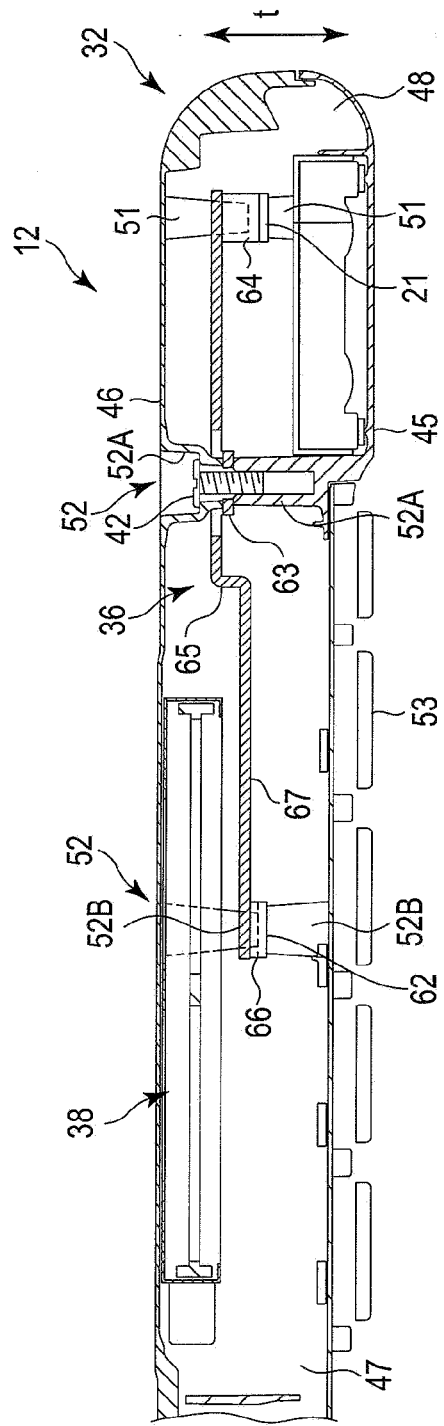
FIG. 9 is an exemplary cross-sectional view taken along a line F9-F9 in FIG. 8.

As shown in FIG. 5, the first reinforcing plate 36 is shaped as a substantially flat plate and made of, for example, stainless steel which is lighter and more workable than carbon steel. The first reinforcing plate 36 extends over both the second storing portion 48 and the first storing portion 47 of the first case 32. As shown in FIG. 9, the first reinforcing plate 36 spaced apart from the first portion 45 and the second portion 46 inside the first case 32.

As shown in FIG. 5 and FIG. 9, the first reinforcing plate 36 comprises a first connecting portion 61 configured to be integrally fixed to the first fixing portion 21, a second connecting portion 62 provided in an end portion opposite from the first connecting portion 61, a third connecting portion 63 provided in a position midway between the first connecting portion 61 and the second connecting portion 62, a first bent portion 64 provided between the first connecting portion 61 and the second connecting portion 63, a first step portion 65 and a second step portion 66 provided between the second connecting portion 62 and the third connecting portion 63, and an overlapping portion 67 which is substantially rectangular and overlaps the memory card slot 38 in the thickness direction t. The first to third connecting portions 61 to 63 are respectively provided with through holes to pass the first to third fixing members 41 to 43 therethrough. The second connecting portion 62 has a drawn portion which is higher than the surrounding parts. The first reinforcing plate 36 comprises a drawn portion in the third connecting portion 63, the first bent portion 64, the first step portion 65 and the second step portion 66, so that it can reinforce the parts near the pairs of first bosses 51 and the second bosses 52, where stress is liable to concentrate.

The first bent portion 64 is provided near the pair of first bosses 51 and extends in a direction crossing the first shaft 23. The first fixing portion 21 of the first hinge 14 and the first connecting portion 61 of the first reinforcing plate 36 are sandwiched between the paired first bosses 51 and fixed to the first case 32 by the first fixing member 41. The second connecting portion 62 and the third connecting portion 63 are sandwiched between the paired second bosses 52 and fixed to the first case 32 by the second fixing portion 42.

The overlapping portion 67 has a first hole 67A for positioning and a second hole 67B for provisional fixing. A positioning pin projecting from the first portion 45 of the first case 32 is inserted through the first hole 67A. A provisional fixing screw 68 for provisional fixing is inserted through the second hole 67B to provisionally fix the first reinforcing plate 36 to the first portion 45 of the first case 32 (refer to FIG. 8). The overlapping portion 67 can restrict the position of a memory card. Therefore, for example, when the user inserts or removes a memory card in or from the memory card slot 38, even if force is applied to the memory card in a direction perpendicular to the direction of insertion or removal, the memory card slot 38 can be prevented from being deformed. For this reason, a top panel is omitted from the memory card slot 38.

Figure 7:
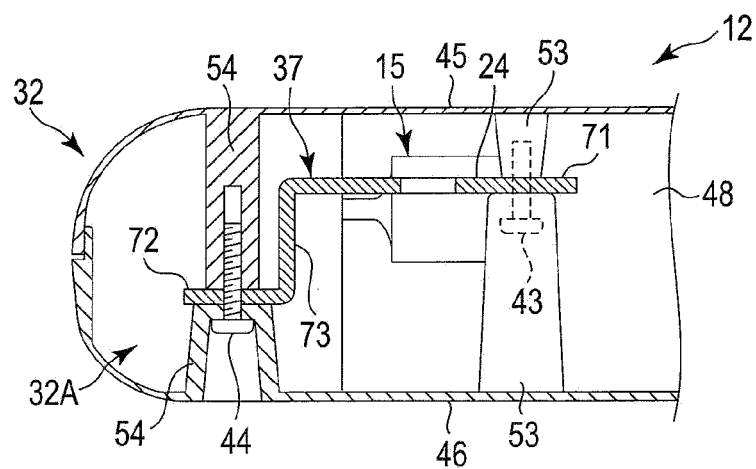
FIG. 7 is an exemplary cross-sectional view taken along a line F7-F7 in FIG. 6.
Figure 8:
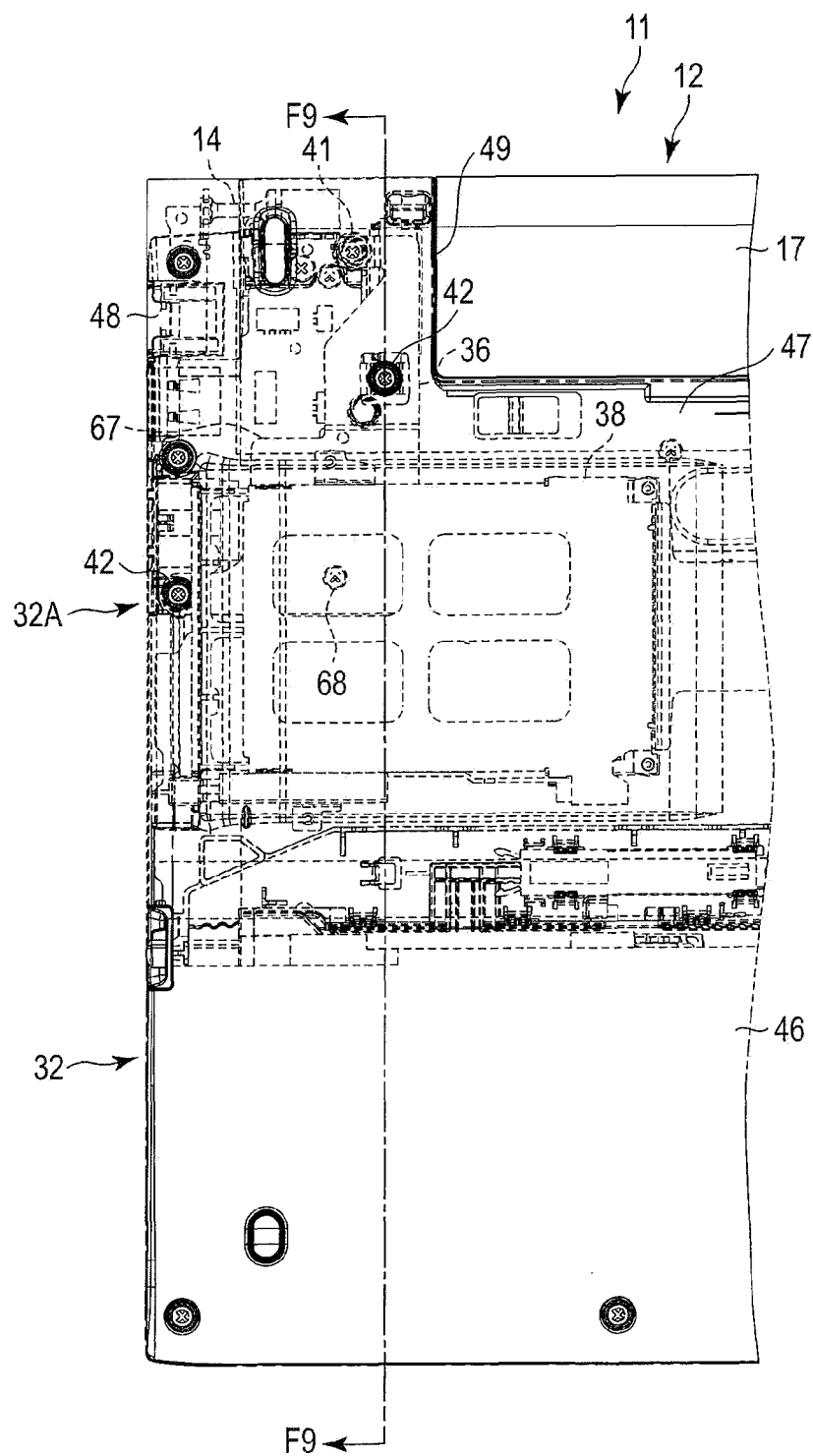
FIG. 8 is an exemplary bottom view showing the first case (main body unit) of the portable computer shown in FIG. 1.

As shown in FIG. 6 and FIG. 7, the third fixing portion 24 of the second hinge 15 is provided with a fourth connecting portion 71. The fourth connecting portion 71 is provided with a through hole to pass the third fixing member 43 therethrough. The fourth connecting portion 71 is sandwiched between the paired third bosses 53 and fixed to the first case 32 by the third fixing member 43.

The second reinforcing plate 37 is formed integral with the third fixing portion 24 and smaller than the first reinforcing plate 36. As well as the parts of the second hinge 15, the second reinforcing plate 37 is formed of carbon steel. The second reinforcing plate 37 comprises a fifth connecting portion 72 provided at an end opposite from the position adjacent to the third fixing portion 24, and a second bent portion 73 located between the pair of third bosses 53 and the pair of fourth bosses 54. The fifth connecting portion 72 is provided with a through hole to pass the fourth fixing member 44 therethrough. The fifth connecting portion 72 is sandwiched between the paired fourth bosses 54 and fixed to the first case 32 by the fourth fixing member 44.

The second bent portion 73 is provided near the pair of fourth bosses 54. The second bent portion 73 is located between the paired third bosses 53 and the paired fourth bosses 54 and extends in a direction crossing the second shaft 26.

Figure 10:
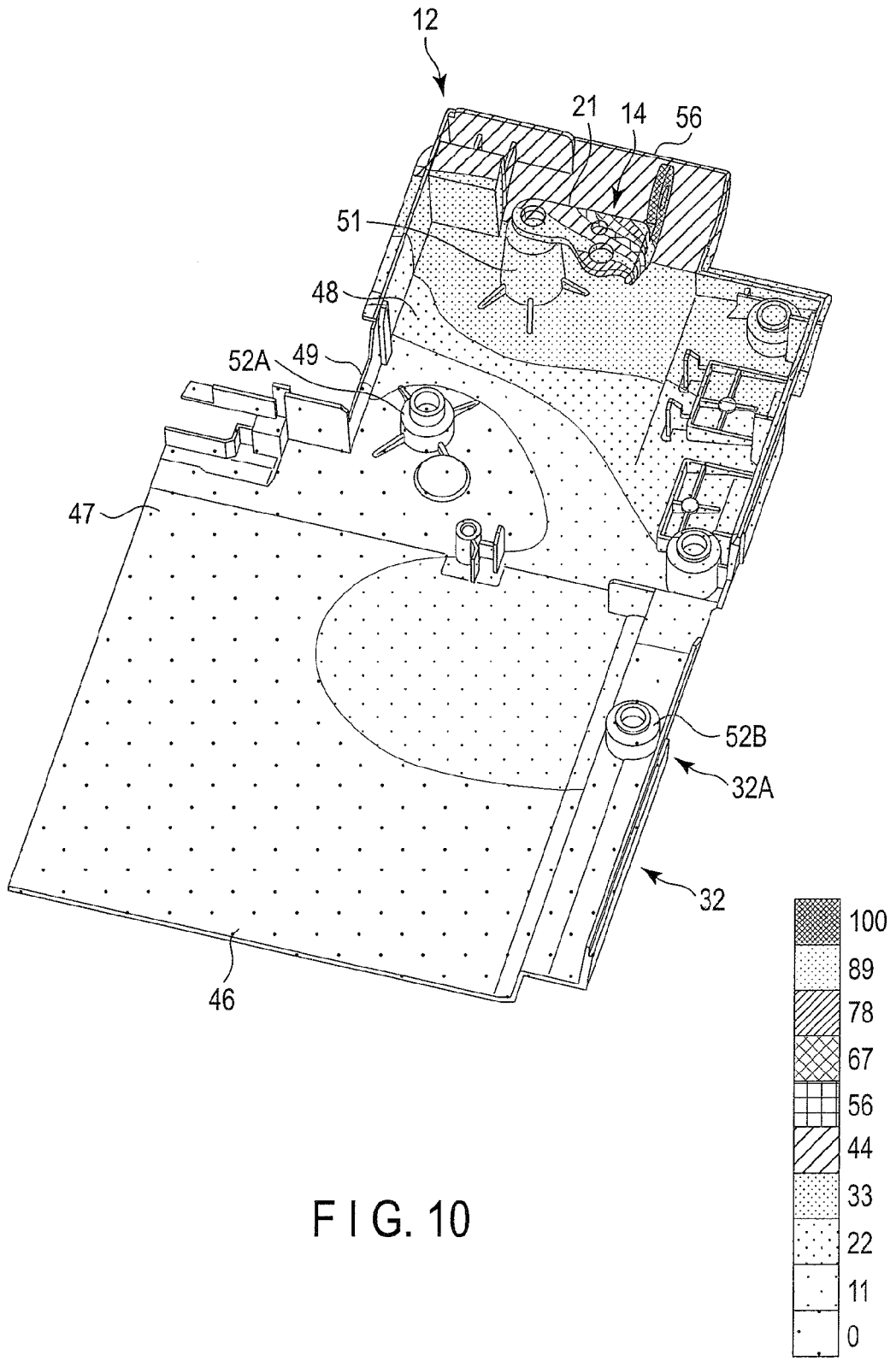
FIG. 10 is an exemplary perspective view showing a result of evaluating a stress in a case of not using a first reinforcing plate of this embodiment.
Figure 11:
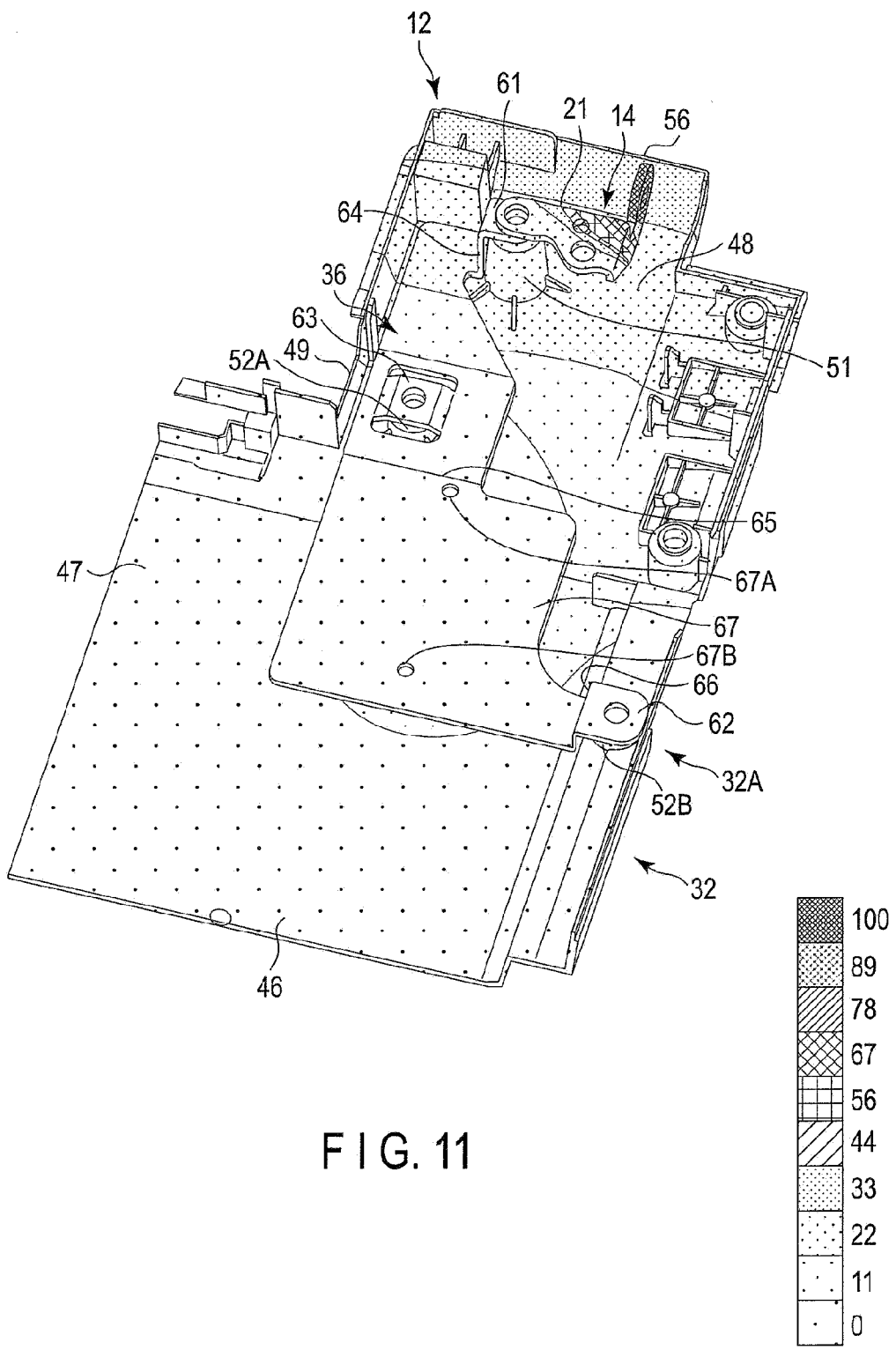
FIG. 11 is an exemplary perspective view showing a result of evaluating a stress in a case of using the first reinforcing plate of this embodiment.

FIG. 10 and FIG. 11 show results of evaluating a stress exerted on the first case 32 respectively in cases of not using and using the first reinforcing plate 36 of this embodiment. As shown in FIG. 10, in the case of not using the first reinforcing plate 36, assuming that the value of a maximum stress exerted on the first hinge 14 was 100, a stress value detected near the first pair of bosses 51 of the second storing portion 48 was 33 and a stress value detected near the most distal end portion 56 of the second storing portion 48 was 44.

On the other hand, as shown in FIG. 11, in the case of using the first reinforcing plate 36, assuming that the value of a maximum stress exerted on the first hinge 14 is 100, a stress value detected near the first pair of bosses 51 of the second storing portion 48 was 22, which was clearly lower than that in the case of not using the first reinforcing plate 36. A stress value detected near the most distal end portion 56 of the second storing portion 48 is 33, which was also clearly lower than that in the case of not using the first reinforcing plate 36. The evaluation results described above proved that the first reinforcing plate 36 reduced the stress exerted on the first storing portion 47 and the second storing portion 48 of the first case 32. Thus, wobbling of the second case 28 (display unit 13) was prevented by using the first reinforcing plate 36.

Evaluation results in cases of not using and using the second reinforcing plate 37 are omitted from the descriptions. However, when the second reinforcing plate 37 was used together with the first reinforcing plate 36, it was confirmed that the second reinforcing plate 37 supplementarily contributed to vibration isolation of the second case 28 (display unit 13).

According to the first embodiment, the portable computer 11 comprises the first case 32 having the first cover 45 and the second cover 46, the second case 28 formed separate from the first case 32 and containing the display panel 27, the first hinge 14 comprising the first fixing portion 21 fixed to the first case 32 and the second fixing portion 22 fixed to the second case 28 and rotatably connecting the first case 32 and the second case 28, and the first reinforcing plate 36 configured to be fixed to the first fixing portion 21 and spaced apart from the first portion 45 and the second portion 46 inside the first case 32. The first case 32 comprises the first storing portion 47 storing electronic parts and the second storing portion 48 projecting from the first storing portion 47 and storing the first fixing portion 21. The first reinforcing plate 36 extends over both the first storing portion 47 and the second storing portion 48.

With this configuration, the first reinforcing plate 36 is spaced apart from the first portion 45 and the second portion 46 inside the first case 32. Therefore, when the second case 28 vibrates, the stress is actively dissipated to the first reinforcing plate 36, which is spaced apart from both the first portion 45 and the second portion 46. As a result, the stress transferred to the second storing portion 48 of the first case 32 is minimized. Accordingly, the first reinforcing plate 36 is deformed rather actively, so that it can primarily absorb the stress. For this reason, the second storing portion 48 of the first case 32 cannot bend in its entirety, and the second case 28 is prevented from wobbling. Further, with this configuration, since the first reinforcing plate 36 extends over both the first storing portion 47 and the second storing portion 48, the stress concentrating in the second storing portion 48 can be dissipated to the first storing portion 47. Thus, the second case 28 is prevented from wobbling and the product quality is ensured.

In this embodiment, the first case 32 has the pair of first bosses 51 respectively projecting from the first cover 45 and the second cover 46. The first fixing portion 21 and the first reinforcing plate 36 are sandwiched between the paired first bosses 51 and fixed to the first case 32 by the first fixing member 41. With this configuration, since the first fixing portion 21 and the first reinforcing plate 36 are fixed to both the first cover 45 and the second cover 46 of the first case 32, the first fixing portion 21 and the first reinforcing plate 36 can be firmly supported.

Further, the first hinge 14 has the first shaft 23 provided between the first fixing portion 21 and the second fixing portion 22, and the first reinforcing plate 36 has the first bent portion 64, which is provided near the pair of first bosses 51 and extends in a direction crossing the first shaft 23. With this configuration, the stress that is generated around the first shaft 23 can be sufficiently received by the first bent portion 64 which has high strength. Accordingly, the stress cannot dissipate to the other portion of the first case 32 and the second case 28 is prevented from wobbling.

The first case 32 has a plurality of pairs of second bosses 52, one of each pair of second bosses projecting from the first cover 45 and the other projecting from the second cover 46. The first reinforcing plate 36 is sandwiched between the paired second bosses 52 and fixed to the first case 32 by the second fixing member 42. At least one pair of the second bosses 52 are provided in the first storing portion 47. With this configuration, the stress received by the first reinforcing plate 36 can be dissipated to the first storing portion 47 of the first case 32 via the pair of the second bosses 52. Therefore, the stress is prevented from concentrating in the second storage portion 48 of the first case 32 and the second case 28 is prevented from wobbling.

The portable computer 11 further comprises the memory card slot 38 contained within the first case 32, and the first reinforcing plate 36 includes the overlapping portion 67 which overlaps the memory card slot 38 in the thickness direction t. With this configuration, the memory slot card 38 may have a simple structure, for example, a top panel can be omitted. Thus, the electronic apparatus can be light in weight. Moreover, since the first reinforcing plate 36 serves to substitute for a top panel, the second case 28 (display unit 13) is prevented from wobbling.

The first reinforcing plate 36 is made of stainless steel. Therefore, as compared to the case of using a first reinforcing plate 36 made of carbon steel, the degree of freedom of the layout can be improved; for example, the workability can be improved to form a drawn portion or the like. In addition, the electronic apparatus as a whole can be more light-weighted. Furthermore, since the first reinforcing plate 36 is made of a material with a lower stiffness as compared to the first fixing portion 21 of the first hinge 14, it is deformed rather actively. Thus, the stress is absorbed primarily by the first reinforcing plate 36.

The portable computer 11 also comprises the second hinge 15, which rotatably connects the first case 32 and the second case 28 and has the third fixing portion 24 fixed to the first case 32, the fourth fixing portion 25 fixed to the second case 28, and the second shaft 26 provided between the third fixing portion 24 and the fourth fixing portion 25. The portable computer 11 further comprises the second reinforcing plate 37 integral with the third fixing portion 24. The first case 32 has the pair of third bosses 53 respectively projecting from the first portion 45 and the second portion 46 and the pair of fourth bosses 54 respectively projecting from the first portion 45 and 46. The third fixing portion 24 is sandwiched between the pair of third bosses 53 and fixed by the third fixing member 43. The second reinforcing plate 37 is sandwiched between the pair of fourth bosses 54 and fixed to the first case 32 by the fourth fixing member 44.

With this configuration, since the second reinforcing plate 37 is provided in addition to the first reinforcing plate 36, the second case 28 (display unit 13) is prevented from wobbling more reliably. Furthermore, the third fixing portion 24 is sandwiched between the pair of third bosses 53 and fixed to the first case 32 by the third fixing member 43, and the second reinforcing plate 37 is sandwiched between the pair of fourth bosses 54 and fixed to the first case 32 by the fourth fixing member 44. Thus, the third fixing portion 24 and the second reinforcing plate 37 are supported by the pair of third bosses 53 and the pair of fourth bosses 54 more firmly. In this respect, the second case 28 (display unit 13) is prevented from wobbling more reliably.

The pair of fourth bosses 54 are provided near the pair of third bosses 53, the second reinforcing plate 37 has the second bent portion 73, which is located between the pair of third bosses 53 and the pair fourth bosses 54 and extends in a direction crossing the second shaft 26. With this configuration, the second reinforcing plate 37 further improves the strength of the main body unit and prevents the second case 28 (display unit 13) from wobbling more reliably.

Figure 12:
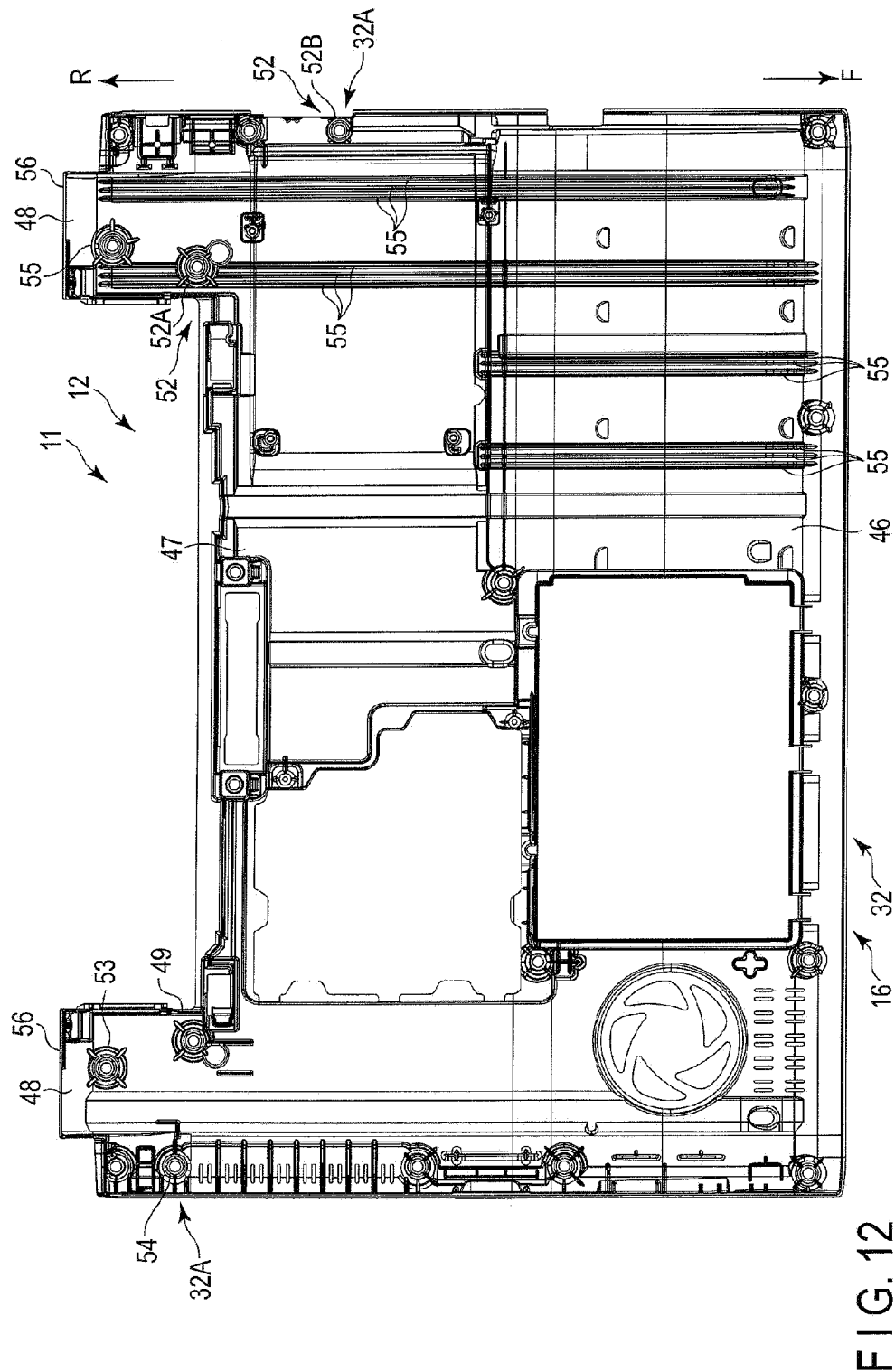
FIG. 12 is an exemplary top view showing a second portion of a first case of a portable computer as an example of an electronic apparatus according to a second embodiment.

A second embodiment of the electronic apparatus will now be described with reference to FIG. 12. A portable computer 11 as an example of the electronic apparatus according to the second embodiment is substantially the same in primary configuration as the first embodiment. Therefore, parts different from those of the first embodiment will mainly be explained. The same parts are identified by the same reference symbols as those used for the first embodiment and the descriptions thereof are omitted.

In the second embodiment, reinforcing ribs 55 of a second portion (second cover) 46 extend over all width of a second portion 46 (a first case 32) in a front-back direction. The reinforcing ribs 55 extend over both the first storing portion 47 and the second storing portion 48 of the first case 32. Therefore, the strength of the second storing portion 48 of the first case 32 is improved. In this embodiment, the reinforcing ribs 55 are provided in only the second portion 46 of the first case 32. However, the reinforcing ribs 55 may naturally be provided also in the first portion 45 of the first case 32 over both the first storing portion 47 and the second storing portion 48.

In the second embodiment, at least one of the first portion 45 and the second portion 46 has the reinforcing ribs 55 on an inner surface thereof, which extend over both the first storing portion 47 and the second storing portion 48. In general, if the second storing portion 48 is provided, the strength of the first case 32 is reduced in that portion. However, with the configuration described above, the strength at the second storing portion 48 is substantially maintained without an extreme reduction. Accordingly, the second case 28 (display unit 13) can be supported stably. Thus, the second case 28 is much more prevented from wobbling.

The electronic apparatus is not limited to the portable computer 11 of the embodiments described above, but may be another type of electronic apparatus, such as a cellular phone or an electronic book reader which electronically displays a book or image.

Further, the electronic apparatus is not limited to the above embodiments without change, but may be embodied in practice within the spirit of the invention while the structural elements are modified. Furthermore, various inventions can be achieved by suitably combining a plurality of structural elements in the embodiments described above. For example, some of the structural elements disclosed as the embodiments may be deleted. Moreover, structural elements of different embodiments may be suitably combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a first case comprising a first cover and a second cover;
   a second case separate from the first case, the second case comprising a display panel;
   a first hinge comprising a first fixing portion fixed to the first case and a second fixing portion fixed to the second case, wherein the first hinge rotatably connects the first case and the second case; and
   a first reinforcing plate configured to be fixed to the first fixing portion, the first reinforcing plate spaced apart from an inner surface of the first cover and an inner surface of the second cover inside the first case,
   a memory card slot within the first case,
   the first case further comprising a first storing portion configured to store electronic parts and a second storing portion projecting from the first storing portion and including a first boss projecting from the second cover, the second storing portion configured to store the first fixing portion,
   the first reinforcing plate including a connecting portion fixed to the first boss, a bent portion bent from the connecting portion substantially along a direction of projection of the first boss and extending over both the first storing portion and the second storing portion, and an overlapping portion which overlaps the memory card slot in a thickness direction, and
   the connecting portion of the first reinforcing plate and the first fixing portion overlying the connecting portion being fixed to the first boss by a first fixing member.

2. The electronic apparatus of claim 1, wherein:
   the first case comprises a plurality of second bosses projecting from the second cover, and the first reinforcing plate fixed to the second bosses by the second fixing members; and
   at least one of the second bosses are provided in the first storing portion.

3. The electronic apparatus of claim 1, wherein at least one of the first cover and the second cover comprises a reinforcing rib, the reinforcing rib route over both the first storing portion and the second storing portion.

4. The electronic apparatus of claim 1, wherein the first reinforcing plate comprises stainless steel.

5. The electronic apparatus of claim 1, further comprising:
a second hinge which rotatably connects the first case and the second case, the second hinge comprising a third fixing portion fixed to the first case, a fourth fixing portion fixed to the second case; and
a second reinforcing plate integral with the third fixing portion,
wherein:
the first case comprises a third boss projecting from the second cover, and a fourth boss projecting from the second cover;
the third fixing portion fixed to the third boss by the third fixing member; and
the second reinforcing plate fixed to the fourth boss by the fourth fixing member.

6. The electronic apparatus of claim 3, wherein:
the fourth boss is provided near the third boss; and
the second reinforcing plate comprises a portion which is bent along a direction of projection of the fourth boss and, which is located between the third boss and the fourth boss.

7. An electronic apparatus comprising:
a first casing comprising a first portion and a second portion from which a boss projects;
a second casing separate from the first casing, the second casing comprising a display panel;
a hinge comprising a first fixing portion fixed to the first casing and a second fixing portion fixed to the second casing, wherein the hinge rotatably connects the first casing and the second casing;
a memory card slot within the first casing, and a first reinforcing plate including a connecting portion integrally fixed to the first fixing portion with the first fixing portion overlying on the connecting portion being fixed to the boss by a first fixing member and a portion bent from the connecting portion substantially along a direction of projection of the boss, and spaced apart from the first portion, the second portion inside the first casing,
wherein the first reinforcing plate comprises an overlapping portion which overlaps the memory card slot in a thickness direction.

* * * * *